United States Patent [19]

Maucher et al.

[11] Patent Number: 4,700,821
[45] Date of Patent: Oct. 20, 1987

[54] CLUTCH PLATE

[75] Inventors: Paul Maucher, Sasbach; Rudolf Hönemann, Ottersweier, both of Fed. Rep. of Germany

[73] Assignee: Luk Lamellen und Kupplungsbau GmbH, Bühl, Fed. Rep. of Germany

[21] Appl. No.: 799,007

[22] Filed: Nov. 18, 1985

[30] Foreign Application Priority Data

Nov. 23, 1984 [DE] Fed. Rep. of Germany ....... 3442717

[51] Int. Cl.$^4$ .............................................. F16D 3/66
[52] U.S. Cl. .................................. 192/106.2; 464/63; 464/68
[58] Field of Search .................. 192/106.2; 464/63, 68

[56] References Cited

U.S. PATENT DOCUMENTS

| 3,931,876 | 1/1976 | Beeskow et al. | 464/68 X |
| 4,044,874 | 8/1977 | Worner | 464/68 X |
| 4,101,015 | 7/1978 | Radke | 464/68 X |
| 4,493,408 | 1/1985 | Nagano | 192/106.2 |
| 4,526,261 | 7/1985 | Maier et al. | 192/106.2 |
| 4,564,097 | 1/1986 | Kabayama | 192/106.2 X |
| 4,577,742 | 3/1986 | Saida | 192/106.2 |

FOREIGN PATENT DOCUMENTS 57771 11/1969 Fed. Rep. of Germany .
2318908 4/1980 Fed. Rep. of Germany .

Primary Examiner—Rodney H. Bonck
Attorney, Agent, or Firm—Peter K. Kontler

[57]     ABSTRACT

A clutch plate with a first and a main damping unit wherein only the first damping unit is operative during a first stage of angular displacement of the input and output components of the clutch plate and only the main damping unit is operative during the remaining stage of such angular displacement. A load friction generating device is installed between the input and output elements of the first damping unit in such a way that it is effective only during an advanced part of the first stage of angular displacement and then cooperates with one or more compressible coil springs of the first damping unit. The load friction generating device is effective when the engine of a vehicle wherein the friction clutch between the crankshaft and the change-speed transmission embodies the clutch plate is idling and/or while the vehicle is set in motion.

28 Claims, 6 Drawing Figures

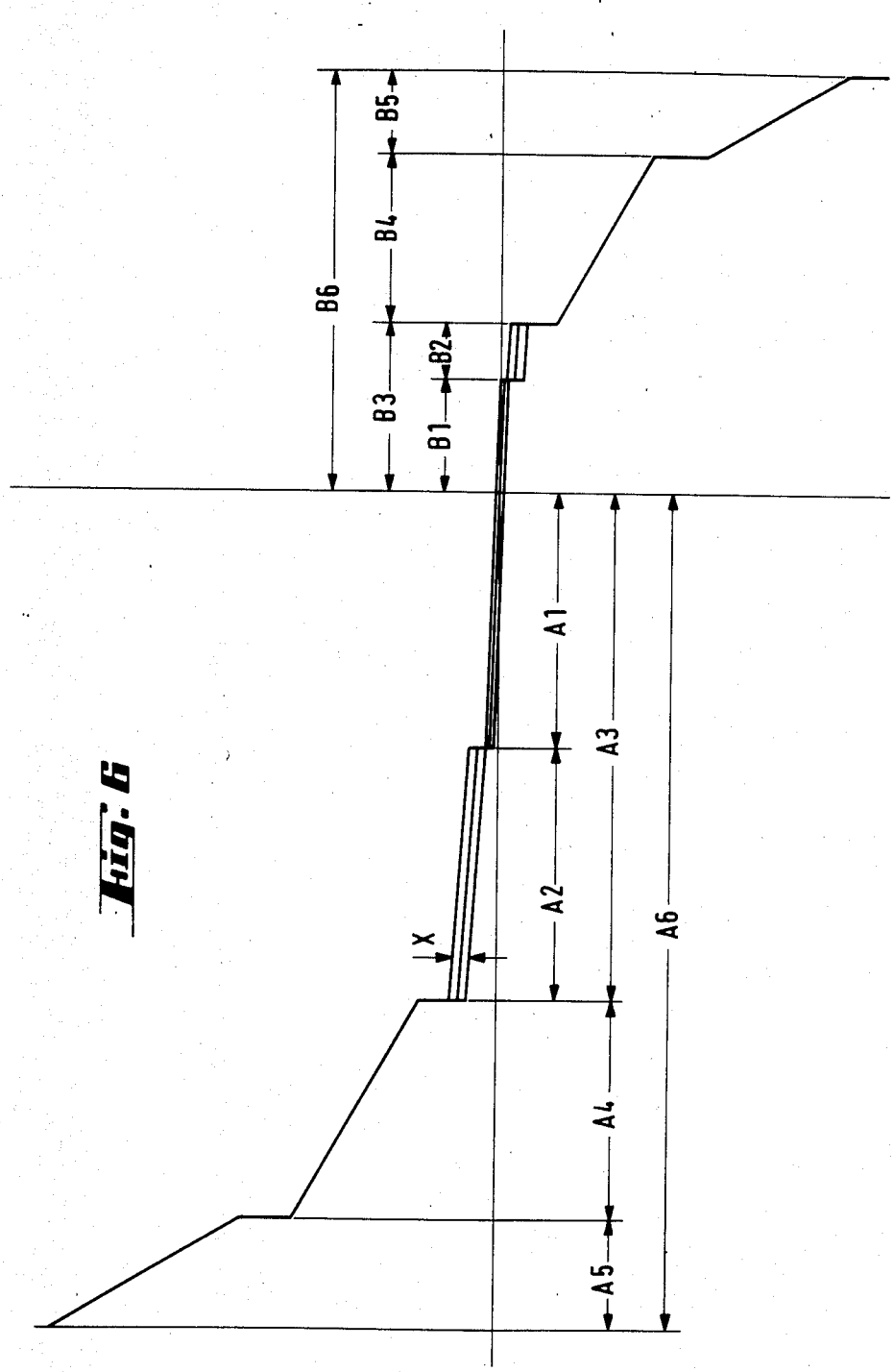

CLUTCH PLATE

CROSS-REFERENCE TO RELATED APPLICATION

The clutch plate of the present application is related to that which is disclosed in the commonly owned copending patent application Ser. No. 801,565 filed Nov. 25, 1985 by Paul Maucher et al. for "Torsion damping assembly for clutch plates".

BACKGROUND OF THE INVENTION

The present invention relates to friction clutches in general, especially to friction clutches for use in motor vehicles. More particularly, the invention relates to improvements in clutch plates or clutch discs which are used in friction clutches to transmit torque between driving and driven parts and normally have friction linings which come into direct frictional engagement with the driving and driven parts, e.g., with a flywheel which receives torque from the crankshaft of an Otto engine or diesel engine and with a pressure plate which is movable axially toward and away from the flywheel.

It is already known to install several damping units between the input and output components of a clutch plate. For example, East German Pat. No. 57,771 discloses a clutch plate wherein a first damping unit is operative during a first stage of angular movement of the input and output components of a clutch plate relative to each other, and a second or main damping unit is operative between such components during the remaining or second stage of angular movement. Each damping unit comprises a set of coil springs which yieldably oppose angular movements of the input and output elements or members of the respective damping units relative to each other. It is also known to provide the one and/or the other damping unit with a load friction generating device whose parts generate friction in response to angular displacements of the input and output elements or members of the respective damping unit relative to each other. The diagram in FIG. 4 of the East German patent indicates that this reference proposes to use a first damping unit which opposes small relative angular displacements of the input and output components of the clutch plate such as will develop between the crankshaft and the change-speed transmission during idling of the engine in a motor vehicle, and to use a second or main damping unit which is operative when the vehicle is in motion. The construction of the patented clutch plate is such that the first and second damping units comprise common input and output elements or members. The patented clutch plate further comprises two discrete friction generating devices which are intended to achieve a variable frictional damping action. One of these friction generating devices is operative during each and every stage of operation of the first damping unit, and the other friction generating device (which constitutes a load friction generating device) is effective during each and every stage of operation of the second or main damping unit. The second friction generating device cooperates with the springs of the second damping unit. A drawback of the patented clutch plate is that the frictional damping action is constant during each and every stage of operation of the first damping unit as well as during each and every stage of operation of the second damping unit. This affects the versatility of the patented clutch plate so that the latter cannot be used in conjunction with many types of modern internal combustion engines which are of lightweight design and wherein the idling speed is very low so that the fluctuations of rotational speed of certain parts are very pronounced.

German Pat. No. 2,318,908 discloses a clutch plate with a load friction generating device which is designed to become operative during a certain stage of operation of the first damping unit as well as during each stage of operation of the second or main damping unit. As shown in the diagram of FIG. 4 in this patent, the clutch plate is designed to generate an asymmetrical frictional hysteresis regardless of whether the crankshaft drives the input element of the change-speed transmission or vice versa, and such hysteresis is superimposed upon the spring characteristic of energy storing means in the main damping unit. The load friction generating device merely increases the moment while it is effective during the last stage of operation of the first damping unit. The patented clutch plate is capable of reducing noise in the power train between the engine and the change-speed transmission, and such clutch plate also contributes to longer useful life of the friction clutch as well as to the elimination of certain problems which are attributable to undesirable vibrations. However, the clutch plate is still unsatisfactory during certain stages of operation of a motor vehicle, particularly while the engine is idling as well as during the period of transition from operation with the first damping unit to operation with the second or main damping unit. Thus, the patented clutch plate cannot adequately suppress resonant movements (vibrations) and the attendant rattling and/or rumbling noises.

OBJECTS AND SUMMARY OF THE INVENTION

An object of the invention is to provide a novel and improved clutch plate which is constructed and assembled in such a way that it can greatly reduce noise and vibratory as well as other stray movements under those circumstances and during those stages of operation when the performance of the aforediscussed conventional clutch plates is unsatisfactory.

Another object of the invention is to provide a clutch plate whose operation is satisfactory not only while the vehicle which embodies the friction clutch utilizing the improved clutch plate is in motion but also during idling as well as during resumption of motion.

A further object of the invention is to provide a clutch plate whose useful life is longer than that of heretofore known clutch plates and which is simple and inexpensive in spite of its pronounced versatility.

An additional object of the invention is to provide a novel and improved method of assembling the damping units and the friction generating means of the above outlined clutch plate.

Still another object of the invention is to provide novel and improved damping units and novel and improved friction generating means for use in the above outlined clutch plate.

A further object of the invention is to provide a friction clutch which embodies the improved clutch plate.

Another object of the invention is to provide a power train, particularly in a motor vehicle, which utilizes the above outlined clutch plate.

An additional object of the invention is to provide a clutch plate which can be used in the existing friction clutches of motor vehicles as a superior substitute for heretofore known clutch plates.

The invention resides in the provision of a clutch plate, particularly for use in the friction clutches of motor vehicles, which comprises coaxial input and output components having limited freedom of angular movement relative to each other, a first damping unit which is interposed between the input and output components to oppose a first stage of the angular movement and includes coaxial rotary input and output elements and energy storing means interposed between such elements to yieldably oppose their rotation relative to each other, a second damping unit which is interposed between the components to oppose at least a part of the remaining second stage of angular movement and includes coaxial rotary input and output members and second energy storing means interposed between such members to yieldably oppose their rotation relative to each other, and at least one load friction generating device which is interposed between the elements of the first damping unit and generates friction during an advanced portion of the first stage. Such load friction generating device comprises at least one disc having a portion cooperating with the first energy storing means. For example, the first energy storing means can comprise a plurality of discrete coil springs or otherwise configurated resilient elements at least one of which extends into an opening (e.g., a window) provided therefor in the one disc of the load friction generating device.

The first energy storing means can comprise means for resetting the one disc to a predetermined angular position, at least during a certain part of the advanced portion of the first stage of angular movement of the input and output components relative to each other. The first energy storing means can comprise several groups of discrete energy storing resilient elements in the form of coil springs or the like. The arrangement is preferably such that the first stage of relative angular movement of the input and output components relative to each other includes a first portion (immediately after the components leave their neutral positions) and a second portion, and the load friction generating device is preferably operative during the second portion of the first stage. The load friction generating device can be idle during the remaining (second) stage of angular movement of the input and output components relative to each other.

The load friction generating device is preferably designed to generate a frictional hysteresis of between 0.5 and 2.5 Nm, preferably between 0.7 and 1.6 Nm if the clutch plate is installed in the friction clutch between an Otto engine and a change-speed transmission in a motor vehicle, and between 1.2 and 2.3 Nm if the engine is a diesel engine.

The load friction generating device can comprise means (e.g., one or more protuberances on the one disc) for limiting its range of operation. An additional load friction generating device can be provided for the second damping unit, and such additional device can be mounted for operation during a second (advanced) portion of the remaining or second stage of angular movement of the input and output components of the clutch plate relative to each other.

The output component can comprise a hub which is formed with internal and external teeth, the output element of the first damping unit can comprise a first flange which is non-rotatably affixed to the hub, the output member of the second damping unit can comprise a second flange which has internal teeth mating with the external teeth of the hub so as to enable the hub and the second flange to perform limited angular movements relative to each other, the first energy storing means preferably comprises first springs which are received in windows provided therefor in the input element and in the first flange, the second energy storing means can comprise second springs received in windows which are provided therefor in the input member and in the second flange, and the input element preferably comprises two plates (e.g., in the form of discs) which flank the first flange and are non-rotatably secured to the second flange. The internal teeth of the hub can transmit torque to the input shaft of a change-speed transmission.

One plate of the input element of the first damping unit can abut directly against the second flange and the one disc of the load friction generating device can be disposed between the one plate and the first flange to cooperate with at least one of the first springs. The load friction generating device preferably further comprises a second disc which is disposed between the other plate of the input element and the first flange, and resilient means for biasing the second disc against the other plate. Such resilient means can be interposed between the one plate and the one disc. The load friction generating device can further comprise means for holding the discs against angular movement relative to each other, and such holding means can comprise at least one form-locking protuberance provided on one of the discs and extending into a recess provided therefor in the other disc.

The one disc of the load friction generating device can be disposed between the first flange and that plate of the input element of the first damping unit which is immediately adjacent to the second flange. The just mentioned plate can consist of or can contain a friction generating material, particularly a fiber-reinforced synthetic plastic substance.

Resilient means can be interposed between the one disc and one plate of the input element, namely that plate which is disposed at one side of the one disc opposite the first flange. Such resilient means can comprise a prestressed undulate annular spring.

The input component of the clutch plate can comprise two spaced-apart coaxial discs, and the first damping unit as well as the output member of the second damping unit are preferably installed between the discs of the input component. One disc of the input component preferably carries the friction linings of the clutch plate. A dished spring can be interposed between one disc of the input component and one plate of the input element.

The input and output components are angularly movable relative to each other in clockwise and counterclockwise directions, and the load friction generating device can be designed to be operative only during at least one stage of rotation of such components relative to each other in a clockwise or in a counterclockwise direction.

The novel features which are considered as characteristic of the invention are set forth in particular in the appended claims. The improved clutch plate itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 is a diagram wherein the angular displacement of the input and output components of the clutch plate is measured along the abscissa and the torque is measured along the ordinate, the frictional hysteresis which develops when the clutch is in use being shown only within the range of operation of the first damping unit.

DESCRIPTION OF THE PREFERRED EMBODIMENTS

Figure 1:
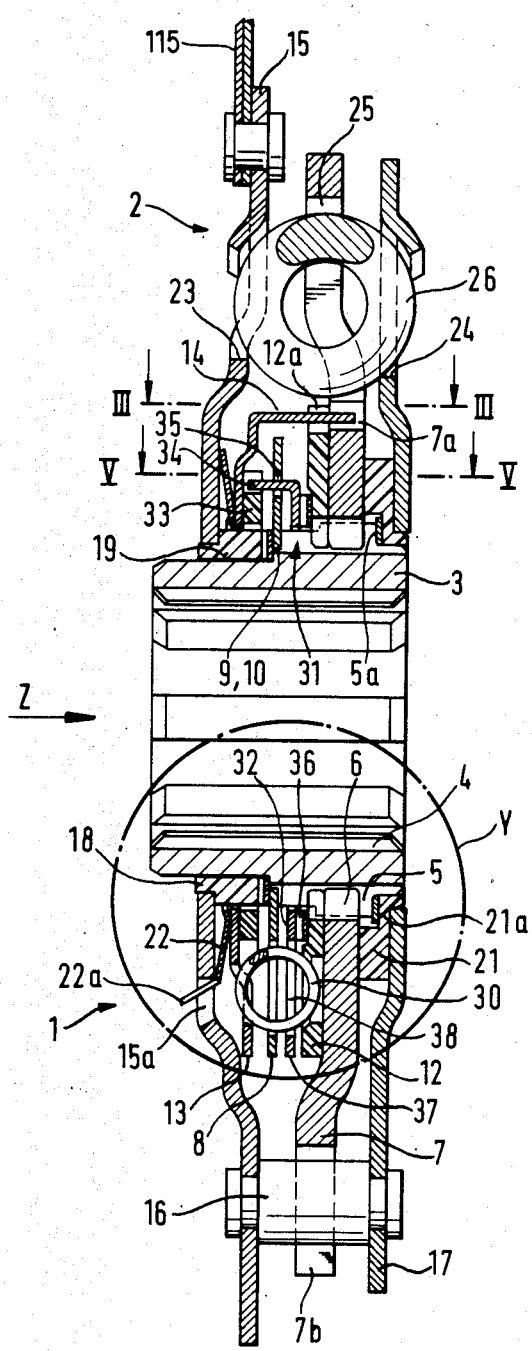
FIG. 1 is a fragmentary sectional view of a clutch plate which embodies the invention.
Figure 2:
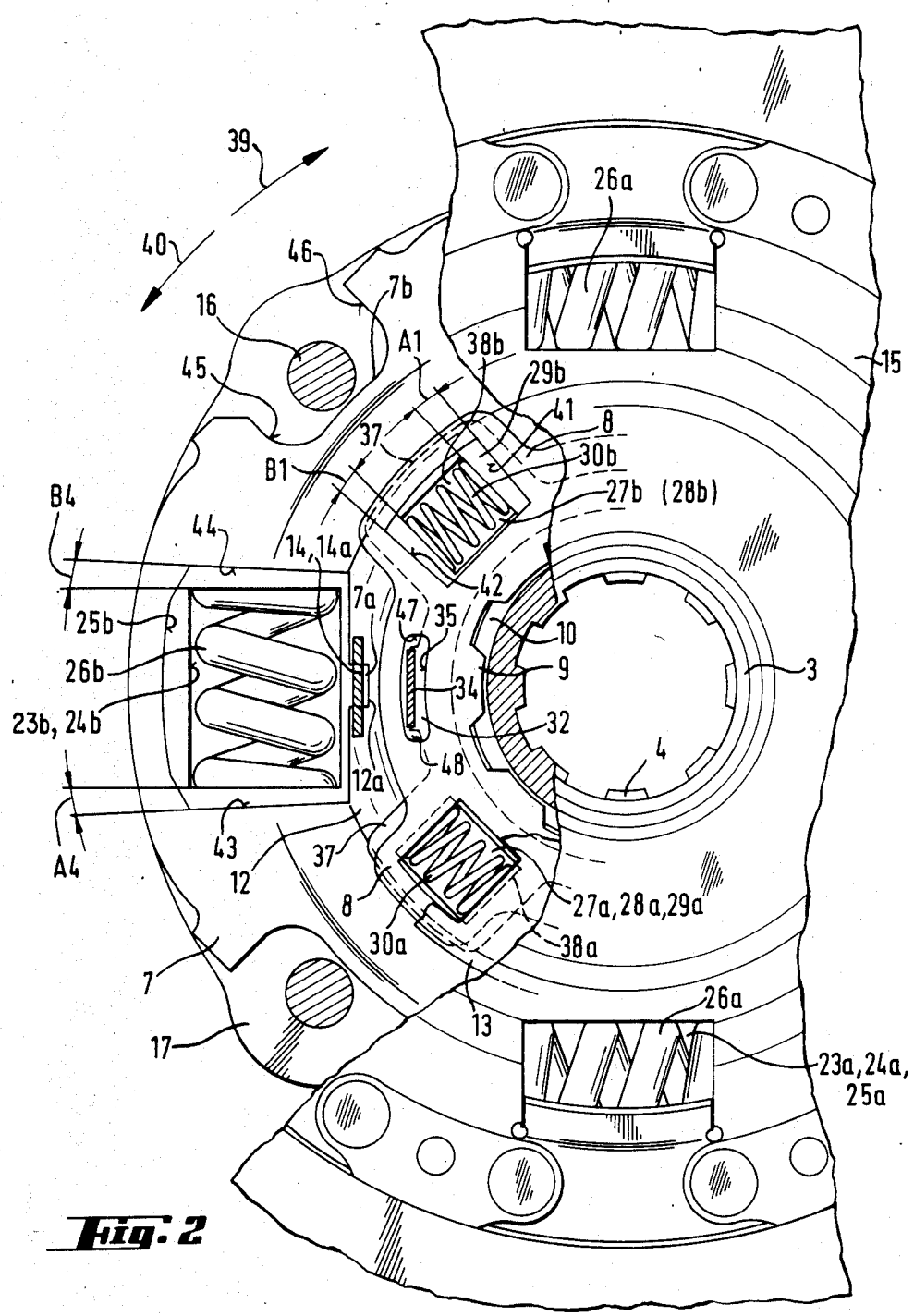
FIG. 2 is a fragmentary elevational view as seen in the direction of arrow Z in FIG. 1, with certain parts broken away.

The clutch plate which is shown in FIGS. 1 and 2 comprises a first damping unit 1 and a second or main damping unit 2. The two damping units are mounted on a hub-shaped output component 3 of the clutch plate. The component 3 (hereinafter called hub for short) has a set of axially parallel internal teeth 4 which can be placed into mesh with the external teeth of the input shaft of a change-speed transmission (not shown) if the improved clutch plate is to be used in a friction clutch between the crankshaft of the internal combustion engine and the input shaft of the change-speed transmission in a motor vehicle. The hub 3 is further formed with a set of axially parallel external teeth 5 which are in mesh with the internal teeth 6 of a flange 7 constituting the output member of the main damping unit 2. The teeth 5 and 6 mate with a certain amount of play (as considered in the circumferential direction of the hub 3) which determines the operating range of the first damping unit 1. A second flange 8, which is non-rotatably secured to the hub 3, constitutes the output element of the first damping unit 1. The internal teeth 9 of the flange 8 are in mesh (without play) with the axially projecting extensions 10 of external teeth 5 on the hub 3. The extensions 10 are shorter than the main portions of the teeth 5, as considered in the radial direction of the hub 3. The flange 8 can be a press fit on the extensions 10. The main portions and the extensions 10 of the external teeth 5 define a circumferentially extending annular shoulder or stop 11 for the respective side of the flange 8.

The input element of the first damping unit 1 comprises two axially spaced-apart disc-shaped members 12 and 13 (hereinafter called plates) which flank the flange 8 and are form-lockingly secured to each other against angular and/or axial movement as well as against angular and/or axial movement relative to the output member or flange 7 of the main damping unit 2. The form-locking means comprises a plurality of projections in the form of lugs 14 (see also FIG. 3) which are provided at the periphery of the plate 13 and have narrower end portions or tips 14a which extend in parallelism with the axis of the hub 3 adjacent to the peripheral surface of the flange 8 and into recesses 7a provided therefor in the peripheral surface of the flange 7. The width of the end portions or tips 14a matches the width of the respective recesses 7a as well as the width of cutouts 12a in the peripheral surface of the plate 12. Shoulders 14b which are defined by the lugs 14 adjacent to their tips 14a are caused to abut against the respective side of the plate 12 so that the latter is urged against and is held in direct contact with the flange 7. The recesses 7a communicate with windows 25 which are provided in the flange 7 for portions of coil springs 26 constituting the energy storing means of the main damping unit 2.

The lugs 14 permit the plates 12, 13 and the flange 7 to turn as a unit relative to the flange 8 and vice versa.

The input component of the clutch plate comprises a pair of coaxial discs 15, 17 which are non-rotatably secured to each other by rivets 16 whose median portions extend into cutouts or slots 7b in the peripheral surface of the flange 7. The length of the cutouts 7b (as considered in the circumferential direction of the hub 3) determines the extent to which the discs 15, 17 can turn relative to the flange 7 and vice versa. The radially outermost portion of the disc 15 carries the customary friction linings 115 which an be clamped between a flywheel and a pressure plate when the improved clutch plate is installed in a friction clutch. The discs 15, 17 (which are held at a fixed axial distance from each other) constitute the input member of the main damping unit 2. The radially innermost portion of the disk 17 surrounds the major portions of external teeth 5 on the hub 3, and the radially innermost portion of the disc 15 surrounds a cylindrical external surface 19 of the hub 3 adjacent to the extensions 10 of the teeth 5. A friction ring 18 is in direct contact with the surface 19 of the hub 3 and is surrounded by the disc 15 (reference can be had to FIG. 4). The friction ring 18 has an end face 18a which faces toward but is spaced apart from the shoulder 11 of the hub 3, and this ring can rotate on the surface 19. A prestressed resilient element in the form of an undulate annular spring 20 is interposed between the end face 18a of the friction ring 18 and the flange 8 (output element) of the first damping unit 1 to maintain the flange 8 in mesh with the extensions 10 of the teeth 5 as well as to urge the flange 8 against the shoulder 11. The spring 20 is in frictional engagement with the end face 18a of the friction ring 18.

A second friction ring 21 is inwardly adjacent to the radially innermost portion of the disc 17 and has an annular portion which is surrounded by the disc 17 and surrounds the adjacent end portion of the hub 3 next to the respective end portions of the external teeth 5. The annular portion of the ring 21 forms part of an L-shaped section 21a whose radially extending portion abuts against a washer 5a which is interposed between the adjacent end faces of the teeth 5 and the friction ring 21. The section 21a of the friction ring 21 is biased against the washer 5a (which, in turn, is biased against the teeth 5 of the hub 3) under the action of the undulate spring 20 which urges the friction ring 18 and the disc 15 in a direction to the left, as viewed in FIG. 4, whereby the rivets 16 pull the disc 17 in the same direction.

Figure 3:
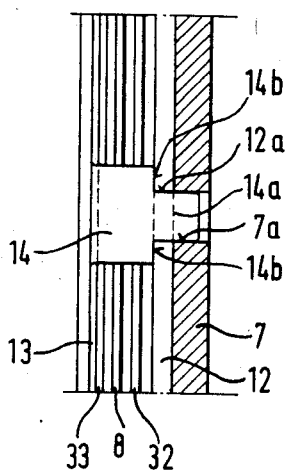
FIG. 3 is a fragmentary sectional view as seen in the direction of arrows from the line III—III of FIG. 1.

The input elements (plates 12 and 13) of the first damping unit 1, the output element (flange) 8 of the first damping unit 1, and the output member (flange) 7 of the second damping unit 2 are confined in the space between the discs (input member of the second damping unit 2 and the input component of the clutch plate) 15 and 17. The form-locking lugs 14 non-rotatably secure the plates 12, 13 to the flange 7. A further resilient element in the form of a dished spring 22 is installed between the disc 15 and the plate 13 to bias the latter toward the plate 12 and flange 7 and to thus maintain the shoulders 14b of the lugs 14 in abutment with the disc 12 whereby the disc 12 bears against the adjacent side of the flange 7 in a manner as shown in FIG. 3. The radially outermost portion of the spring 22 reacts against the disc 15, and the radially innermost portion of this spring bears against the plate 13. The radially outermost portion of the spring 22 is provided with arms 22a which extend into openings 15a of the disc 15 so that the parts 15 and 22 cannot rotate relative to each other. In order to establish a desirable frictional damping action, the radially innermost portion of the spring 22 is formed with a circumferentially extending convex or similarly rounded surface 22b which contacts the respective side of the plate 13. The surface 22b can be provided on a circumferentially extending corrugation of the spring 22. The latter further ensures that the flange 7 is biased in a direction to the right, as viewed in FIG. 4, and bears against the adjacent side of the friction ring 21 i.e., the friction ring 21 is clamped between the flange 7 and the disc 17.

The discs 15, 17 can rotate as a unit relative to the flange 7 (output member of the main damping unit 2), or vice versa, against the opposition of the aforementioned coil springs 26 which constitute the energy storing means of the main damping unit 2 and extend into the adjacent windows 25 of the flange 7 as well as into the registering windows 23 and 24 which are respectively provided in the discs 15 and 17.

The plates 12, 13 can rotate as a unit relative to the flange 8, and vice versa, to the extent which is determined by the play between the teeth 5 and 6 and against the opposition of the energy storing means of the first damping unit 2. Such energy storing means comprises a set of coil springs 30 extending into windows 27, 28 and 29 which are respectively provided in the plate 12, plate 13 and flange 8.

Figure 5:
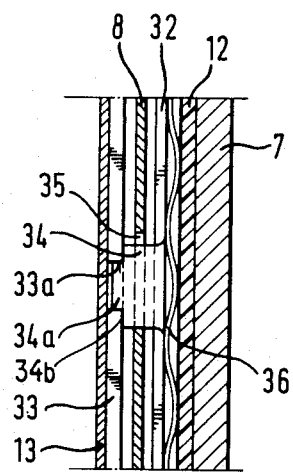
FIG. 5 is a fragmentary sectional view as seen in the direction of arrows from the line V—V of FIG. 1.

The clutch plate further comprises a load friction generating device 31 which is operative during a certain stage of angular movability of the flange 7 and hub 3 relative to each other. The device 31 comprises a load friction disc 32 which is disposed between the plate 12 and the flange 8, and a friction disc 33 which is disposed at the opposite side of the flange 8 and is non-rotatably coupled to the load friction disc 32 in a manner as shown in FIG. 5. The coupling means comprises protuberances in the form of axially extending prongs 34 having narrower end portions or tips 34a. The wider portions of the prongs 34 extend with circumferential play through cutouts 35 in the flange 8, and the tips 34a extend into recesses 33a which are provided therefor in the friction disc 33. The prongs 34 have shoulders 34b which bias the disc 33 against the plate 13 under the action of an undulate spring 36 which is inserted, in prestressed condition, between the plate 12 and the disc 32. The tips 34a are received in the recesses 33a without play so that the discs 32 and 33 cannot turn relative to each other.

In the embodiment of FIGS. 1 to 5, the plate 12 is made of a synthetic plastic material, namely of a friction generating or "slip" material which is or can be reinforced by fibers. Thus, the plate 12 enables the damping unit 1 to generate a frictional damping action. The undulate spring 36 bears directly against the plate 12 and urges the latter against the flange 7. At the same time, the spring 36 urges the load friction disc 32 axially of the clutch plate and away from the flange 7 so that the shoulders 34b of the prongs 34 urge the friction disc 33 against the plate 13. The undulate spring 36 is weaker than the dished spring 22.

The periphery of the load friction disc 32 is provided with radially outwardly extending legs 37 having windows 38 for the coil springs 30 of the first damping unit 1.

FIG. 2 shows that the coil springs 30 are assembled into two groups 30a and 30b. Only one spring of each of these groups is actually shown in FIG. 2. The springs 30 of the group 30b are active during a second stage of operation of the first damping unit 1, and the springs 30 of the group 30a are active during such second stage as well as during the preceding first stage of operation of the unit 1.

FIG. 2 further shows that the coil springs are also assembled into two groups 26a and 26b. The group 26b (only one spring 26 of this group is shown in FIG. 2) is active only during a second stage but the group 26a is active during each stage of operation of the main damping unit 2.

Those windows in the plates 12, 13 and in the flange 8 which receive the coil springs 30 of the first group 30a are respectively denoted by the characters 27a, 28a and 29a. The length of the windows 27a–29a (as considered in the circumferential direction of the clutch plate) is the same so that the coil springs 30 of the group 30a start to store energy in immediate response to angular displacement of the plates 12, 13 relative to the flange 8 and/or vice versa, i.e., in immediate response to angular movement of the input component (discs 15, 17) of the clutch plate from its neutral position and relative to the output component or hub 3. The length of the windows 38a for the coil springs 30 of the group 30a (as measured in the circumferential direction of the clutch plate) exceeds the corresponding dimensions of the windows 27a–29a, i.e., the springs 30 of the group 30a do not engage the surfaces surrounding the respective windows 38a during the initial stage of operation of the first damping unit 1.

The windows 27b, 28b for the springs 30 of the group 30b have identical dimensions but their length (as considered in the circumferential direction of the clutch plate) is less than that of the windows 29b in the flange 8. The springs 30 of the group 30b extend into the respective windows 29b. The length of the windows 38b in the load friction disc 32 for the springs 30 of the group 30b is the same as that of the windows 29b.

It will be seen that the first damping unit 1 has two stages of operation; during the first stage, the plates 12, 13 can turn relative to the flange 8 against the opposition of the springs 30 of the group 30a but the plates 12, 13 must turn relative to the springs 30 of the groups 30a and 30b during the next-following second stage of operation of the unit 1.

The third stage of operation of the damping means including the units 1 and 2 is the first stage of operation of the second damping unit 2. During such third stage, the discs 15 and 17 (which constitute the input component of the clutch plate as well as the input member of the second damping unit 2) can turn against the opposition of the springs 26 of the group 26a which are disposed in identically dimensioned windows 23a, 24a, 25a of the disc 15, of the disc 17 and of the flange 7, respectively. The springs 26 of the second group 26b are received in identically dimensioned windows 23b, 24b of the discs 15, 17 as well as in the longer windows 25b of the flange 7.

The mode of operation of the improved clutch plate will be described with reference to FIGS. 2 and 6. The arrow 39 denotes the drive direction, and the arrow 40 denotes the direction of coasting. In other words, and if the clutch plate is installed in a friction clutch between the engine and the change-speed transmission of a motor vehicle, the crankshaft of the engine will rotate the discs 15, 17 in the direction of arrow 39 when the wheels are driven by the engine, and the hub 3 will tend to rotate the discs 15, 17 in the direction of arrow 40 when the vehicle is coasting.

When the discs 15, 17 are caused to rotate with reference to the hub 3 in the direction of the arrow 39 or 40, the springs 30 of the group 30a forming part of the energy storing means of the first damping stage 1 become active in immediate response to such axial displacement because the length of the windows 27a, 28a in the plates 12, 13 matches the length of the windows 29a in the flange 8. In view of such dimensioning of the windows 27a–29a, the springs 30 of the group 30a invariably tend to maintain the discs 15, 17 and the hub 3 in predetermined neutral positions relative to each other. Such neutral positions are shown in FIG. 2.

After the discs 15, 17 complete an angular movement A1 (arrow 39) or B1 (arrow 40) by turning relative to the hub 3 and the flange 8 (the latter cannot rotate with reference to the hub 3), further angular displacement of the discs 15 and 17 necessitates a deformation of the springs 30 of the second group 30b in addition to further deformation of springs 30 in the first group 30a. This is due to the fact that the edge faces 41 in the windows 29b of the flange 8 begin to deform the springs of the group 30b as soon as the discs 15, 17 complete an angular movement A1 (arrow 39). Analogously, the edge faces 42 in the windows 29b deform the springs 30 of the group 30b when the discs 15, 17 complete an angular movement through the distance B1 and continue to turn in the direction of arrow 40. When the discs 15, 17 complete an additional angular movement (through the distance A2 in the direction of arrow 39 or through the distance B2 in the direction of arrow 40), the internal teeth 6 of the flange 7 strike against the adjoining external teeth 5 of the hub 3 which terminates the effectiveness of the first damping unit 1 (whose full operating range is A3=A1+A2 in the direction of arrow 39 and B3=B1+B2 in the direction of arrow 40. Thus, any further angular displacement of the discs 15, 17 in the direction of arrow 39 or 40 necessitates a deformation of at least some springs 26 of the energy storing means in the second or main damping unit 2.

If the angular distance A3 is exceeded in the direction of the arrow 39 or if the angular distance B3 is exceeded in the direction of the arrow 40, and since the flange 7 cannot turn relative to the hub 3, the discs 15, 17 must start to turn relative to the flange 7 (i.e., the input member of the damping unit 2 must turn relative to the output member of the unit 2 as well as relative to the output component). The springs 26 of the first group 26a store energy during a first stage (angle A4 in the direction of arrow 39 or angle B4 in the direction of arrow 40) of operation of the damping unit 2. When the angle exceeds A4 or B4, the discs 15, 17 can rotate relative to the flange 7 and hub 3 only against the joint opposition of the springs 26 forming the group 26a and the springs 26 in the group 26b, i.e., the groups 26a and 26b of springs 26 then operate in parallel. At such time, the edge faces 43 in the windows 25b of the flange 7 deform the springs 26 of the group 26b as soon as the discs 15, 17 complete an angular movement beyond A3+A4 (arrow 39) or the edge faces 44 deform the springs 26 of the group 26b as soon as the discs 15, 17 complete an angular movement B3+B4 in the direction of arrow 40. The second portion of operation of the damping unit 2 involves an angular movement of the discs 15, 17 through the additional distance A5 in the direction of arrow 39 or through the additional distance B5 in the direction of arrow 40. Such second portion is completed when the intermediate portions of the rivets 16 between the discs 15, 17 strike the edge faces 46 or 45 in the respective cutouts 7b of the flange 7. The total angular displacement of the discs 15, 17 in the direction of arrow 39 from their neutral positions until the rivets 16 strike the edge faces 46 equals A6=A3+A4+A5, and the total angular displacement of the discs 15, 17 from their neutral positions in the direction of arrow 40 (until the rivets 16 strike the edge faces 45 in the respective cutouts 7b of the flange 7) equals B6=B3+B4+B5.

When the discs 15, 17 leave their neutral positions of FIG. 2 by turning in the direction of the arrow 39 or 40, the ring 18 and the section 21a of the ring 21 start to generate friction without delay because the length of the windows 23a, 24a matches the length of the windows 25a for the springs 26 of the first group 26a (the spring rate of 26a is high). The discs 15, 17 and the flange 7 then rotate as a unit with reference to the hub 3. Friction which is generated by the ring 18 and ring section 21a is related to the bias of the relatively soft or weak springs 30 of the group 30a, i.e., such friction is very low and is effective while the discs 15, 17 turn through the angle A1 or B1. When the angular displacement of the discs 15, 17 exceeds A1 or B1, the prongs 34 of the load friction disc 32 engage the edge faces 47 (arrow 39) or 48 (arrow 40) in the respective cutouts 35 of the flange 8 so that the discs 32 and 33 cannot rotate with reference to the flange 8. This causes the discs 32, 33 to rotate relative to the flange 7 and also with reference to the parts (particularly the plates 12, 13) which are non-rotatably connected with the flange 7, until the internal teeth 6 of the flange 7 strike against the external teeth 5 of the hub 3. During the just discussed angular movement of the discs 32, 33 relative to the flange 7 and plates 12 and 13 (i.e., through the angle A2 or B2), the moment of friction which is generated is somewhat more pronounced, and such moment is related to the combined bias of the springs 30 which form the groups 30a and 30b. The moment of friction which is generated during the angular displacement through the angle A2 or B2 is added to or superimposed upon that which is generated by the friction ring 18 and by the section 21a of the friction ring 21, i.e., the friction rings 18, 21 then cooperate with the device 31 to generate a rather pronounced moment of friction. The device 31 becomes ineffective as soon as the operating range (angle A3 or B3) of the first damping unit 1 is exceeded.

The friction ring 21 and the dished spring 22 furnish a frictional damping action while the discs 15, 17 rotate through the angles A4 and A5 (arrow 39) or through the angles B4 and B5 (arrow 40). Such damping action is attuned to the bias of those springs 26 which form the groups 26a and 26b. The frictional damping action which is effective while the angular displacements of the discs 15, 17 are opposed by the main damping unit 2 is much more pronounced than that which can be generated by the device 31. The frictional hysteresis X which develops while the damping unit 2 is operative is a multiple of that which is generated by the load friction generating device 31 (the frictional hysteresis which is generated by the device 31 during operation of the damping unit 2 is not shown in the diagram of FIG. 6). It is desirable and advantageous if the frictional hysteresis which is generated by the device 31 is in the range of between 0.5 and 2.5 Nm. For Otto engines, such hysteresis is preferably between 0.6 and 1.7 Nm. The preferred range for diesel engines is between 1.2 and 2.3 Nm. It is further desirable and advantageous to ensure that the frictional hysteresis which is generated by the friction rings 18, 21 during the initial stage (angle A1 or B1) of operation of the damping stage 1 is less than 0.7 Nm for Otto engines and less than 1.2 Nm for diesel engines.

The springs 30 of the group 30b which cooperate with the load friction generating device 31 are installed in the windows 27b, 28b of the plates 12, 13 in prestressed condition. The initial stressing is selected in such a way that the restoring moment which is generated by the springs 30 of the group 30b at least matches the frictional moment of the device 31. This ensures that the device 31 remains effective during angular displacement through the entire angle A2 or B2 irrespective of whether the springs 30 of the group 30b store or dissipate energy. Thus, prestressing of the springs 30 in the group 30b ensures that the load friction generating device invariably assumes a predetermined idle or neutral position.

However, the clutch plates of certain friction clutches can also be constructed and assembled in such a way that the springs (in the illustrated embodiment the springs 30 of the group 30b) which cooperate with the load friction disc 32 (i.e., with the device 31) exert upon the device 31 a restoring moment which is smaller than the moment of friction of the device 31, at least during a certain stage (see the angle A2 or B2) of operation of the first damping unit 1. This ensures that friction rises gradually during operation of the first damping unit to thus guarantee a desirable suppression of resonant movements and attendant noise.

It is further possible, and even highly desirable in certain types of clutches, to make the device 31 to operate only during certain stages of rotation of the discs 15, 17 in the direction of the arrow 39, e.g., while the discs 15, 17 turn through the angle A2 (second part of operation of the first damping unit 1). This can be achieved in a simple manner in that the prongs 34 extend into the respective cutouts 35 of the flange 8 with a clearance which at least matches the angle B3 (i.e., while the discs 15, 17 turn in the direction of the arrow 40).

The operation of the improved clutch plate is such that, starting from the neutral position of the discs 15, 17 which is shown in FIG. 2, angular movements of these discs with reference to the hub 3 (in a clockwise or in a counterclockwise direction) are opposed only by certain springs 30 of the first damping unit 1 while the friction generating device 31 remains ineffective or offers only negligible resistance to angular movement of the parts 12–13 and 8 relative to each other. The device 31 becomes effective during the second portion or stage of operation of the damping unit 1, namely while the discs 15, 17 turn through the angle A2 or B2, and the friction which is generated by the device 31 is related to the operation of the unit 1 in that the springs of the energy storing means of the unit 1 cooperate with the disc 32 through the medium of surfaces bounding the openings or windows 38 in the legs 37 of the disc 32. Thus, the first damping unit 1 can generate a frictional hysteresis which is variable (e.g., stepwise) independently of the energy storing means of the main damping unit 2. As mentioned above, the springs 30 of the group 30b can serve to reset the friction generating device 31 at least during a portion of angular displacement through the angle A2 or B2.

The improved clutch plate can effectively suppress rattling noises which tend to develop when the transmission of a motor vehicle is cold and the engine is idling. Such rattling noises are especially likely to develop when the magnitude of drag torque which is generated by the transmission matches or approximates the maximum moment which can be transmitted by the first damping unit. These conditions often prevail when the engine is idling and the transmission is cold. The generation of such rattling noises is believed to be attributable (at least in part) to the fact that, under the above outlined circumstances (idling engine and cold transmission), the extent of deviation from normal (particularly as concerns the angular velocity and the magnitude of the torque) is so pronounced that it cannot be counteracted alone by the first damping unit of a conventional clutch plate and, therefore, the main damping unit (whose springs are much stiffer than those of the first damping unit) is set in operation under circumstances which are not best suited for its utilization, i.e., the main damping unit acts not unlike a rigid stop to limit certain fluctuations of torque with attendant generation of rattling noises. The main damping unit of a conventional clutch plate then induces the input and output elements of the first stage to strike against each other as soon as the range of the first damping unit is exceeded so that the input and output elements rebound (because neither can yield due to pronounced rigidity of the springs in the main damping unit). Such repeated impingement and rebounding of input and output elements in the first damping unit of a conventional clutch plate cause the input element of the change-speed transmission to perform undesirable angular oscillatory movements (because the hub of the clutch plate is nonrotatably connected to the input element of the transmission). These angular oscillatory movements of the input element of the transmission, in turn, cause the mating teeth of gears in the transmission to rapidly strike against each other and to generate the aforediscussed noise. Moreover, such oscillatory movements entail pronounced wear upon and shorten the useful life of component parts of the transmission.

The provision of the friction generating device 31 between the input and output elements of the first stage 1 in the improved clutch plate, and the ability of the device 31 to oppose angular movements of the elements 12–13 and 8 relative to each other during certain stages (A2 and B2) of operation of the damping unit 1 in the forward or rearward directions (arrows 39 and 40), enables the first damping unit 1 to effectively suppress or at least strongly reduce the noises which develop when a friction clutch employs a conventional clutch plate wherein the second damping unit becomes effective during those stages of operation when its operation is conducive to the generation of noise.

In the improved clutch plate, the disc 32 of the friction generating device 31 cooperates with the springs 30 of the second group 30b of springs which constitute the energy storing means of the first damping unit 1. The springs 30 of the first damping unit 1 can be assembled into more than two groups and the friction generating device 31 or an analogous friction generating device can cooperate with the springs of more than one group, e.g., with the springs of each but the first group. It is further clear that the manner in which the springs 30 of the group 30b of springs in the first damping unit cooperate with the disc 32 of the friction generating device 31 can be altered in a number of ways without departing from the spirit of the invention. For example, the springs 30 of the group 30b need not extend into openings or windows (38) of the disc 32 if the latter is provided with wings, arms or like parts which engage or are engaged by the springs 30 of the group 30b during a certain or during certain stages of operation of the first damping unit 1. As mentioned above, the initial stressing of spring 30 in the group 30b is preferably such that these springs can generate upon the friction generating device 31 a moment which at least matches but preferably exceeds the frictional moment that is generated by the device 31 to thus ensure that the parts of the device 31 invariably assume predetermined positions with reference to the elements of the first damping unit 1 when the input and output components 15–17 and 3 of the clutch plate are held in their neutral positions. It is particularly advantageous if the springs 30 of the first group 30a are designed to absorb the drag torque of the transmission as well as the superimposed fluctuations of torque and angular movements at normal operating temperatures while the engine is warm and is idling. It is also highly desirable to design the first damping unit 1 in such a way that the friction generating device 31 which is associated with the unit 1 acts not unlike a simple friction control plate and can be bypassed as soon as the engine ceases to idle, i.e., when the vehicle is set in motion and the angular displacement of the discs 15, 17 relative to the hub 3 exceeds the angle A3 or B3. The prongs 34 of the disc 32 cooperate with the end faces 47 or 48 in the respective cutouts 35 of the flange 8 to limit the range of operation of the friction generating device 31.

In order to ensure optimum conformance to the ideal characteristic damping curve, the improved clutch can be provided with one or more additional friction generating devices which cooperate with the main damping unit 2. Such additional device or devices preferably cooperate with the unit 2 while the discs 15, 17 turn through the angle A5 or B5, i.e., during the second stage of operation of the unit 2 (but not during the first stage).

Figure 4:
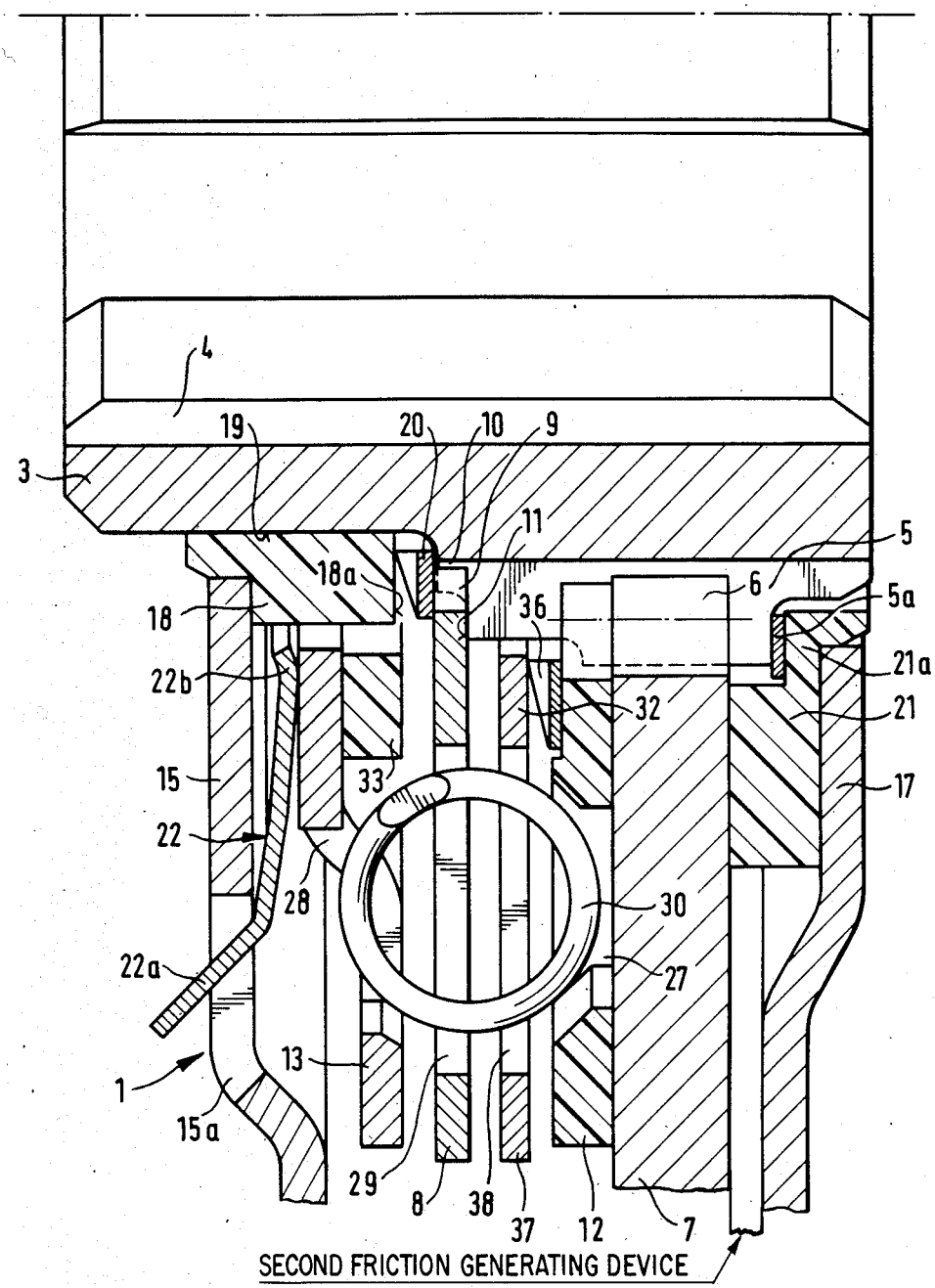
FIG. 4 is an enlarged view of a detail within the phantom-line circle Y in FIG. 1.

FIG. 4 further shows a second friction generating device denoted by a legend) which cooperates with the main damping unit 2.

The provision of internal teeth 4 on the hub 3 is particularly desirable in clutch plates which are designed to transmit torque to the input shaft of a change-speed transmission and wherein the load friction damping device 31 is operated during the last or advanced stage of operation of the first damping unit 1 (as actually shown in the drawing).

The aforediscussed placing of the elements and members of the damping units 1 and 2 next to each other contributes to compactness of the improved clutch plate, particularly in the axial direction of the hub 3. This applies especially for the placing of the plate 12 and disc 32 between the flanges 7 and 8.

The making of the plate 12 from a preferably reinforced synthetic plastic material which exhibits satisfactory friction generating characteristics is desirable and advantageous because this contributes to lower cost of the clutch plate. The material of the plate 12 should be sufficiently strong so that its windows 27 can properly confine portions of the coil springs 30.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A clutch plate, particularly for use in the friction clutches of motor vehicles, comprising coaxial rotary input and output components having limited freedom of angular movement relative to each other; a first damping unit interposed between said components to oppose a first stage of said angular movement and including coaxial rotary input and output elements and first energy storing means interposed between said elements to yieldably oppose their rotation relative to each other; a second damping unit interposed between said components to oppose at least a part of the remaining stage of said angular movement and including coaxial rotary input and output members and second energy storing means interposed between said members to yieldably oppose their rotation relative to each other; and at least one load friction generating device which is interposed between the elements of said first damping unit and generates friction only within an advanced portion of said first stage, said device including at least one part having a portion cooperating with said first energy storing means, said part of said load friction generating device being rotatable with reference to the input and output elements of said first damping unit.

2. The clutch plate of claim 1, wherein said first energy storing means comprises a plurality of discrete resilient elements at least one of which extends into an opening which is provided therefor in said part.

3. The clutch plate of claim 1, wherein said first energy storing means includes means for resetting said position, at least during a part of the advanced portion of said first stage.

4. The clutch plate of claim 1, wherein said first energy storing means comprises several groups of resilient elements.

5. The clutch plate of claim 1, wherein said first stage has a first and a second portion and said device generates friction during the second portion of said first stage.

6. The clutch plate of claim 1, wherein said device is idle during said remaining stage of said angular movement.

7. The clutch plate of claim 1, wherein said device is arranged to generate a frictional hysteresis of between 0.5 and 2.5 Nm.

8. The clutch plate of claim 7 for use in the friction clutch of a motor vehicle having an Otto engine, wherein said hysteresis is between 0.7 and 1.6 Nm.

9. The clutch plate of claim 7 for use in the friction clutch of a motor vehicle having a diesel engine, wherein said hysteresis is between 1.2 and 2.3 Nm.

10. The clutch plate of claim 1, wherein said device further comprises means for limiting its range of operation.

11. The clutch plate of claim 10, wherein said limiting means comprises at least one protuberance on said one part.

12. The clutch plate of claim 1, further comprising at least one additional load friction generating device for said second damping unit.

13. The clutch plate of claim 12, wherein said remaining stage has a first and a second portion and said additional device generates friction during the second portion of said remaining stage.

14. The clutch plate of claim 1, wherein said input component comprises two coaxial discs, said first damping unit and the output member of said second damping unit being disposed between the discs of said input component.

15. The clutch plate of claim 14, further comprising at least one friction lining on one disc of said input component.

16. The clutch plate of claim 1, wherein said input component comprises a disc and said input element comprises a plate adjacent to but axially spaced from the disc of said input component, and further comprising a dished spring interposed between said plate and the disc of said input component.

17. The clutch plate of claim 1, wherein said input and output components are angularly movable relative to each other in first and second directions, said device including means for generating friction during at least one stage of rotation of such components relative to each other in one of said directions.

18. A clutch plate, particularly for use in the friction clutches of motor vehicles, comprising coaxial rotary input and output components having limited freedom of angular movement relative to each other, said output component including a hub having external teeth; a first damping unit interposed between said components to oppose a first stage of said angular movement and including coaxial rotary input and output elements and first energy storing means interposed between said elements to yieldably oppose their rotation relative to each other, said output element comprising a first flange which non-rotatably affixed to said hub and said first energy storing means including first springs received in windows provided therefor in said input element and in said first flange; a second damping unit interposed between said components to oppose at least a part of the remaining stage of said angular movement and including coaxial rotary input and output members and second energy storing means interposed between said members to yieldably oppose their rotation relative to each other, said output member including a second flange having internal teeth mating with said external teeth with limited freedom of angular movement of said second flange and said hub relative to each other, said second energy storing means comprising second springs received in windows provided therefor in said input member and in said second flange, said input element comprising two plates flanking said first flange and non-rotatably secured to said second flange; and at least one load friction generating device which is interposed between the elements of said first damping unit and generates friction during an advanced portion of said first stage, said device including at least one part having a portion cooperating with said first energy storing means.

19. The clutch plate of claim 18, wherein said hub has internal teeth arranged to transmit torque to the input shaft of a transmission.

20. The clutch plate of claim 18, wherein one of said plates abuts directly against said second flange.

21. The clutch plate of claim 20, wherein said one part is disposed between said one plate and said first flange and cooperates with at least one of said first springs, said device further comprising a second part disposed between the other of said plates and said second flange and resilient means for biasing said second part against said other plate.

22. The clutch plate of claim 21, wherein said resilient means is interposed between said one plate and said one part.

23. The clutch plate of claim 21, wherein said device further comprises means for holding said parts against angular movement relative to each other, said holding means including at least one protuberance provided on one of said parts and form-lockingly extending into a recess provided therefor in the other of said parts.

24. The clutch plate of claim 18, wherein one of said plates is immediately adjacent to said second flange and said one part is disposed intermediate said one plate and said first flange.

25. The clutch plate of claim 24, wherein said one plate contains a friction generating material.

26. The clutch plate of claim 18, wherein one of said plates consists of or contains a synthetic plastic material.

27. The clutch plate of claim 29, wherein said one part is disposed between one of said plates and said second flange and said device further comprises resilient means interposed between said one part and said one plate.

28. The clutch plate of claim 27, wherein said resilient means comprises an undulate annular spring.

* * * * *